United States Patent [19]
Raptis

[11] 4,040,199
[45] Aug. 9, 1977

[54] FISHING LINE SINKER ASSEMBLY

[76] Inventor: George M. Raptis, 17876 Vicino Way, Pacific Palisades, Calif. 90272

[21] Appl. No.: 666,622

[22] Filed: Mar. 15, 1976

[51] Int. Cl.² .............................................. A01K 95/00
[52] U.S. Cl. ................................................. 43/43.14
[58] Field of Search ....................................... 43/43.14

[56] References Cited
U.S. PATENT DOCUMENTS

| 77,774 | 5/1868 | Smith | 43/43.14 |
| 549,332 | 11/1895 | Sewell | 43/43.14 |
| 2,557,776 | 6/1951 | Anderson | 43/43.14 |
| 2,863,253 | 12/1958 | Hettinger | 43/43.14 |

Primary Examiner—Louis G. Mancene
Assistant Examiner—Daniel J. Leach
Attorney, Agent, or Firm—Keith D. Beecher

[57] ABSTRACT

A fishing line sinker assembly for deep sea fishing is provided which comprises a series of separate weights, some or all of which may be assembled together, or which may be used individually, so as to provide different weights for different fishing conditions.

3 Claims, 4 Drawing Figures

U.S. Patent    Aug. 9, 1977    4,040,199
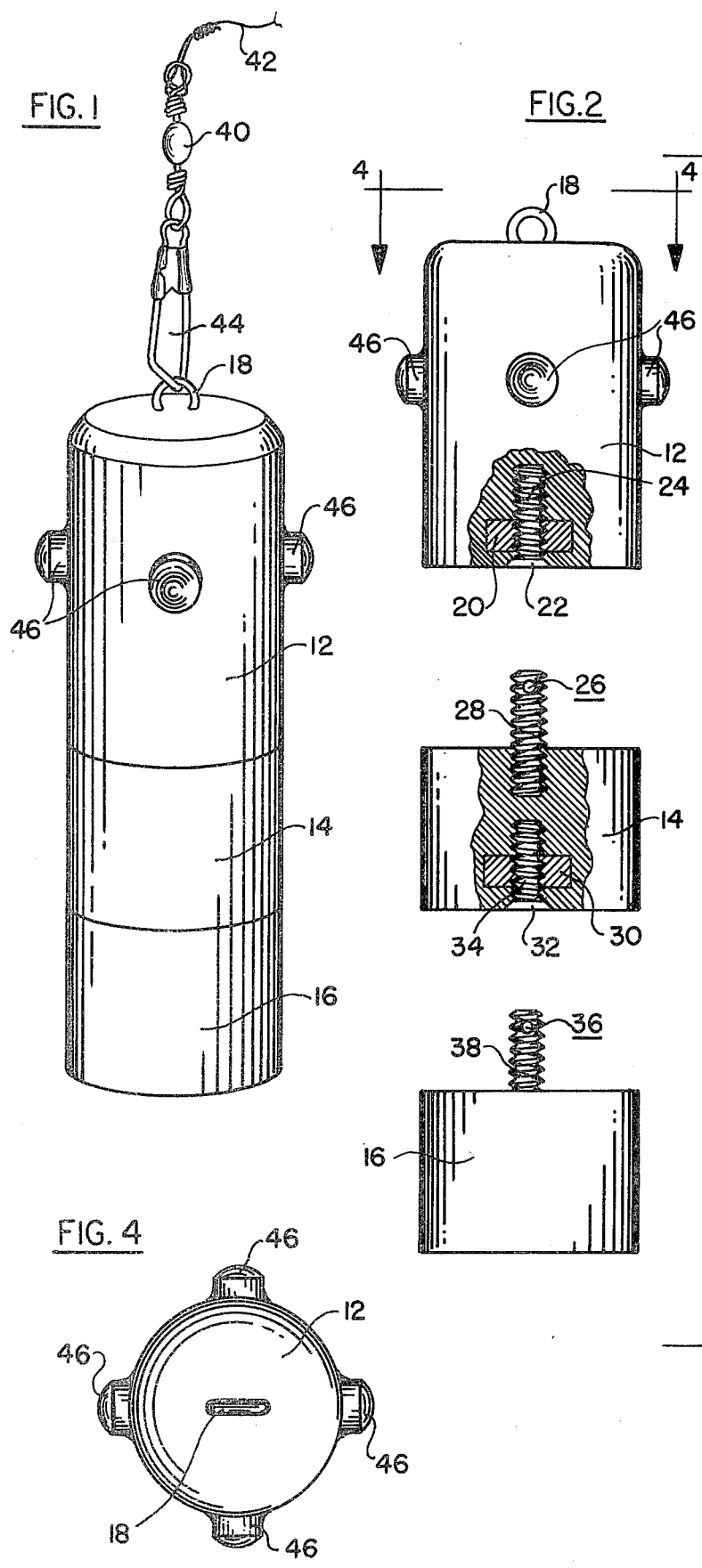
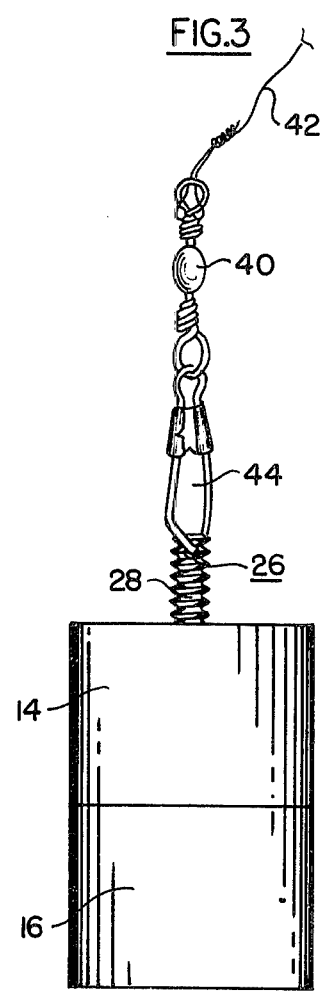

FISHING LINE SINKER ASSEMBLY

BACKGROUND OF THE INVENTION

It is usual practice in deep sea fishing to attach a sinker of considerable weight to the fishing line. For example, 2 and 3 pound lead sinkers are presently available on the market for this purpose. Certain fishing conditions call for the 3 pound prior art sinker, and other fishing conditions in shallower water call for the 2 pound sinker.

The fisherman, therefore, in the prior art, has found it necessary to purchase both a 2 pound sinker and a 3 pound sinker, for example, and to attach one or the other to his fishing line, depending upon the depth at which he wishes to fish.

The sinker assembly of the present invention obviates the prior art necessity of purchasing a multiplicity of different sinkers, and it enables the fisherman to purchase a single sinker assembly which will answer all his needs.

In the illustrated embodiment of the invention, for example, three separate weights may be assembled to provide a 4 pound sinker; one or two weights may be removed to provide a 3 pound or a 2 pound sinker; or one of the weights alone may be used to provide a 1 pound sinker.

BRIEF DESCRIPTION OF THE DRAWINGS

FIG. 1 is a perspective representation of a sinker assembly embodying the invention in one of its aspects, and shown attached to a typical line leader of a fishing line;

FIG. 2 is a detached view, partly in section, of the sinker assembly of FIG. 1;

FIG. 3 shows the manner in which certain components of the assembly of FIG. 1 may be used as a sinker for the fishing line;

FIG. 4 is a top plan view of the sinker assembly of FIG. 1.

DETAILED DESCRIPTION OF THE ILLUSTRATED EMBODIMENT

As shown in FIG. 1, the sinker assembly of the present invention may be composed of three members 12, 14 and 16.

Each member, for example, may be formed of lead. The member 12, for example, may have a weight of 2 pounds, the member 14 may have a weight of 1 pound, and the member 16 may also have a weight of 1 pound.

A loop 18 is formed at the upper end of the member 12 to receive the usual coupling 44 of a fishing line, the coupling being attached through a typical swivel 40 to the line leader 42.

The member 12 may include protuberances 46 to prevent it from rolling when the member, for example, is placed on the deck of a fishing vessel.

As shown in FIG. 2, the member 14 may be removably attached to member 12 by means of a steel stud 28 which is received in a threaded hole 24 in the member 12, the hole having a chamfer 22 at its entrance. A steel nut 20 is imbedded in member 12 to receive the stud 28, and to avoid any likelihood of the stud stripping the threads in the hole of member 12.

Likewise, the member 16 may be removably coupled to the member 14 by a steel stud 38 which is received in a threaded hole 34 in member 14, the hole having a chamfer 32 at its entrance. Likewise, a steel nut 30 is imbedded in the member 14 for receiving the stud 38.

The two members 14 and 16 may be attached to member 12, as shown in FIG. 1 so as to provide an overall weight of 4 pounds. The member 16 may be removed, when a weight of 3 pounds is desired, and both members 14 and 16 may be removed when a weight of 2 pounds is desired.

In addition, the studs 28 and 38 in members 14 and 16 have respective holes 26 and 36. This enables the members 14 and 16 to be coupled together to the fishing line, as shown in FIG. 3, for an additional 2 pound weight, or for either to be used separately, when only a 1 pound weight is desired.

The invention provides, therefore, a single sinker assembly which may be used in a variety of ways to provide different weights. The assembly of the invention is simple to use, and it avoids the necessity of purchasing a variety of different weights for different sinker requirements.

While a particular embodiment of the invention has been shown and described, modifications may be made. It is intended in the claims to cover the modifications which come within the spirit and scope of the invention.

What is claimed is:

1. A sinker assembly for a fishing line including: a first member of substantial weight, means mounted on the first member for receiving the fishing line, at least one further member of substantial weight removably coupled to the first member, the first and second members having a generally cylindrical configuration; and a threaded stud fitted into one of the members to be received in a threaded hole in the other of the members for removably intercoupling the first and second members in which at least one of the members has protuberance means formed on the surface thereof to prevent the assembly from rolling.

2. The sinker assembly defined in claim 1, in which said further member has a weight different from the weight of the first member.

3. The sinker assembly defined in claim 1, in which said threaded stud has a hole therein for receiving the fishing line.

* * * * *